United States Patent
Thorburn

(10) Patent No.: US 7,183,537 B2
(45) Date of Patent: Feb. 27, 2007

(54) ROTARY POSITION SENSOR WITH OFFSET BEAM GENERATING ELEMENT AND ELLIPTICAL DETECTOR ARRAY

(75) Inventor: William G. Thorburn, Whitinsville, MA (US)

(73) Assignee: GSI Group Corporation, Billerica, MA (US)

( * ) Notice: Subject to any disclaimer, the term of this patent is extended or adjusted under 35 U.S.C. 154(b) by 165 days.

(21) Appl. No.: 10/737,199

(22) Filed: Dec. 16, 2003

(65) Prior Publication Data
US 2004/0227065 A1 Nov. 18, 2004

Related U.S. Application Data

(60) Provisional application No. 60/433,828, filed on Dec. 16, 2002.

(51) Int. Cl.
*G01D 5/34* (2006.01)
(52) U.S. Cl. ................................. 250/231.13
(58) Field of Classification Search ..............
250/231.13–231.19, 237 G, 206.1, 206.2, 250/208.2, 208.6, 208.1; 341/13, 14; 345/161
See application file for complete search history.

(56) References Cited

U.S. PATENT DOCUMENTS 4,686,361 A * 8/1987 Bard ........................ 250/221
5,506,579 A    4/1996 Spaulding ................... 341/11
5,943,233 A * 8/1999 Ebina et al. ................ 700/85
6,564,168 B1* 5/2003 Hasser ....................... 702/163
2002/0014581 A1  2/2002 Yamamoto et al. ..... 250/231.13

* cited by examiner

*Primary Examiner*—Thanh X. Luu
(74) *Attorney, Agent, or Firm*—BainwoodHuang

(57) ABSTRACT

A rotary position sensor employs an offset beam forming optical element such as a tilted mirror or a diffraction grating. The axis of the light beam from a source can be parallel to the rotational axis or tilted at a predetermined angle. One or multiple spots of light from reflected/diffracted beam(s) are located on a generally elliptical path on an array of detectors. A detector that is photosensitive only along the elliptical path may be employed, the detector being divided into multiple regions to enable a processor to identify the azimuthal angle of the spot. When a diffraction grating is employed, return beams corresponding to positive first and negative first diffracted orders are generated, and these are displaced substantially symmetrically with respect to the axis of the source. The use of multiple beams can reduce sensitivity to mis-alignment errors. Some aspect of one or more of the beams, such as optical intensity or radial displacement, can be made unique to enable the processor to identify the angular position modulo 360 degrees.

19 Claims, 10 Drawing Sheets

ROTARY POSITION SENSOR WITH OFFSET BEAM GENERATING ELEMENT AND ELLIPTICAL DETECTOR ARRAY

CROSS REFERENCE TO RELATED APPLICATIONS

This application claims priority under 35 U.S.C. §119(e) of U.S. Provisional Patent Application No. 60/433,828 filed Dec. 16, 2002, the disclosure of which is hereby incorporated by reference herein.

STATEMENT REGARDING FEDERALLY SPONSORED RESEARCH OR DEVELOPMENT

Not Applicable

BACKGROUND OF THE INVENTION

The present invention generally relates to the field of position sensing devices. In particular it relates to devices that provide an absolute measure of the rotation angle of one movable member relative to a frame of reference on a fixed member.

Many devices have been developed to measure the rotation angle of movable members. Some of these devices, such as resistive potentiometers, depend on mechanical contact between a movable part and a fixed part. Other devices use a non-contact interaction to interrogate a moving code wheel. Examples of non-contacting interactions include magnetic field sensing, capacitance sensing, and optical intensity sensing.

Code wheel devices come in two variations: incremental and absolute. Incremental devices generally have a single, binary track on the code wheel. The non-contact sensor counts the binary transitions on the track as the code wheel rotates, thereby estimating the change in angular position. Of course, if a count is missed or the power is interrupted, the estimate of angular position becomes unreliable. In an absolute device the code wheel typically has either multiple, concentric binary tracks or a single complex track in which the location around the wheel is encoded as a multi-bit word. Another alternative for encoding the absolute angle is to create a feature on the wheel whose radius is a function of angle, as disclosed in U.S. Pat. No. 5,506,579. With measurements of the radius of this feature, the angle of the wheel can be calculated. This calculation, however, may be in error because of misalignments between the wheel and the sensors.

There remains a need for methods and apparatus that provide improved measurements of the angular displacement between two members.

BRIEF SUMMARY OF THE INVENTION

An apparatus and method are disclosed for determining the angular position of a rotatable element relative to a fixed frame of reference. The apparatus typically comprises an optical sensor head module, usually mounted to the fixed frame of reference and in which a source of illumination and a specialized optical detector reside, and an offset beam forming optical element, typically a diffraction grating and typically attached to the rotatable member.

A beam of light is transmitted from the source (located in the sensor head) toward the offset beam forming element. The axis of the beam is preferably substantially parallel to the rotation axis of the rotatable member, although it may be displaced or offset laterally. In alternative configurations, the axis of the beam is tilted at a predetermined angle to the rotation axis of the rotatable member. In one embodiment, this element includes a plane mirror attached to the rotating member and mounted with the normal to the mirror at a predetermined non-zero angle with respect to the axis of rotation of the rotatable member. The light reaching the mirror is thereby deflected by twice the predetermined angle as it is reflected generally back towards the source. The deflection angle is also called the "polar angle".

Again considering this basic reflective embodiment, the spot of light reaching the sensor head after reflection from the mirror is displaced from the source. When the respective axes of the source and beam generation element are aligned, the spot is located on a circle that has the source as its center. The magnitude of the radius of this circle is proportional to the product of the polar angle and the distance between the mirror and the sensor head, while the azimuthal angle (the location around the circle) is equal to the rotation angle of the rotatable member (viz., the angle to be measured). Thus, as the rotatable member rotates the reflected spot of light traces out a circle around the source in a manner similar to a searchlight beam.

The sensor head includes a custom optical detector. Preferably, this detector is photosensitive only in an annular region around the source, the mean radius of the annulus being equal to the expected radius at which the reflected spot of light travels. Additionally, the detector is divided into two or more regions, thereby allowing a processing circuit to identify approximately the azimuthal angle of the spot. The more finely divided the detector, the more precisely the azimuthal angle can be estimated. The detector may also be displaced from the source, and thus may have a non-annular photosensitive region.

In another reflective embodiment, the mirror is replaced by a reflective diffraction grating mounted substantially perpendicular to the axis of rotation of the rotatable member. The diffraction grating generally produces two return beams of interest, namely the positive first and negative first diffracted orders. These two orders propagate back towards the sensor head, with the two orders displaced substantially symmetrically with respect to the axis of the source. As can be shown using diffraction theory, the angle between the beams and the axis of rotation is predetermined to be equal to the polar angle. Again, the azimuthal angle is determined by the rotation angle of the rotatable member (i.e., the angle to be measured). In this embodiment, the custom detector preferably has four or more detector segments whereby the azimuthal angle of the pair of symmetric spots may be tracked. A particular form of grating known as a "blazed grating" can be advantageously used as the beam forming element. A blazed grating can be designed to produce only a single first diffracted order, and can thus be used in place of a mirror.

Yet another embodiment employs a binary optic diffuse reflector (BODR). A BODR is a special type of diffractive optical element. The phase step patterns in a BODR are calculated to produce shaped, scattered beams. Thus, what appears to be a random diffuser actually is sending randomly phased beamlets off at pre-determined angles to form the desired, uniformly illuminated regions. A BODR can create one, two or any number of beams.

There are alternative embodiments for the detector as well. For example two dimensional detector arrays (such as CCDs) are commonly available and can be used to track the relative position of the searchlight beams. Similarly, quadrant detectors and so-called position sensing (photodiode)

detectors (PSDs) can measure the position of single spots of light and thus can be used to track individual beams.

When N searchlight beams are utilized, N being an integer, an ambiguity of 360/N degrees is inherently present; that is, when the constellation of N beams rotates about the fixed axis by 360/N degrees the beam pattern is indistinguishable from the initial condition. This ambiguity can be resolved by introducing asymmetry into the positions of the N beams, making at least one beam uniquely identifiable. Depending on the capabilities of the detector, the unique beam may be noticeably more intense than the remaining beams, it may be a different color than the remaining beams, it may have a different polar angle, and so on.

Although in the disclosed embodiments employ a reflective beam generation element, the disclosed technique can also be realized in a transmissive configuration, with a transmissive beam generation element having the source and the detector on opposite sides thereof. The beam generation element may comprise a prismatic element operative to impart an angular shift to the beam from the source. Alternatively, the beam generation element may comprise a transmissive diffractive optical element (DOE), the DOE diffractively producing at least one beam of light propagating towards the light detecting elements, the direction of the propagation being at a predetermined angle with respect to the rotation axis between the first member and the second member.

Other aspects, features, and advantages of the present invention will be apparent from the Detailed Description that follows.

BRIEF DESCRIPTION OF THE SEVERAL VIEWS OF THE DRAWINGS

The invention will be more fully understood by reference to the following Detailed Description of the invention in conjunction with the Drawing, of which.

DETAILED DESCRIPTION OF THE INVENTION

Figure 1:
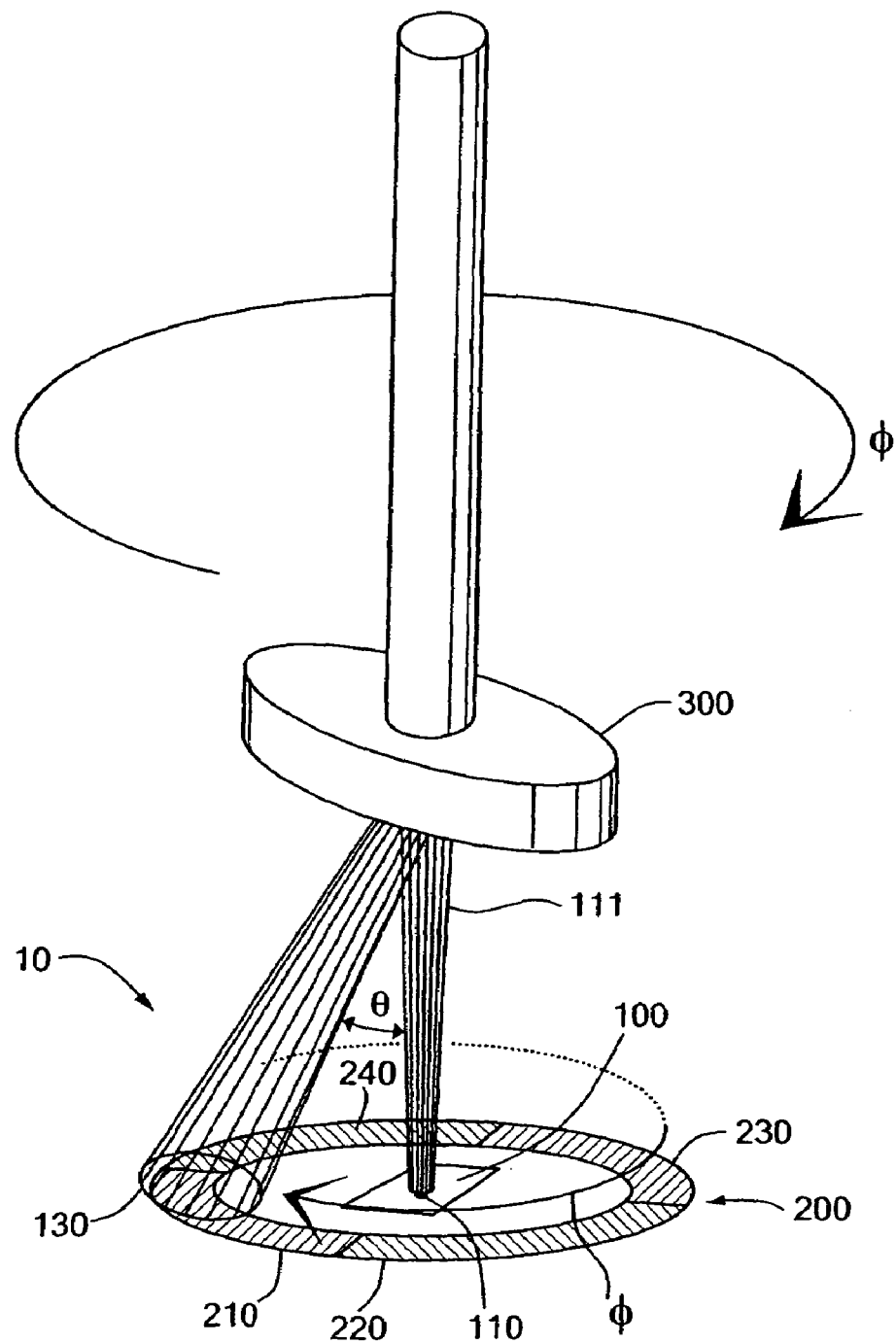
FIG. 1 is a schematic representation of an encoder according to the present invention.

A schematic representation of a rotation angle sensor 10 for measuring the rotation angle of one member of a device relative to a second member of a device, the second member providing the frame of reference, is shown in FIG. 1. The sensor comprises a light source 100 and a detector 200, generally mounted on a common substrate (not illustrated) for convenience, the substrate preferably disposed on the fixed member of the device, and an offset beam generator 300, which is generally mounted to the rotating member of the device. Light emerges from an emitting point 110 on the source 100 in an expanding cone of light 111. The light propagates to beam generator 300 where it is reflectively returned to detector 200. Beam generator 300 generates one or more return beams 120.

Preferably, the propagation direction of the central ray of cone 111 is parallel to the axis of rotation of beam generator 300, in which case the direction of propagation of return beam 120 is preferably offset from the axis of rotation by a polar angle $\theta$. The offset can be achieved using a plane mirror that is tilted with respect to the angle of rotation or by using a diffractive optical element. In an embodiment shown in FIG. 2, the central ray of cone 111 propagates at an angle $\alpha$ relative to the axis of rotation of beam generator 300; in this embodiment the direction of propagation of return beam 120 is offset from a direction $\alpha$ by polar angle $\theta$. That is, the beam is offset from the so-called specular reflection angle by the polar angle. As is described below, beam generator 300 not only directs the return beam 120 at the polar angle $\theta$ but also directs the beam at an azimuthal angle $\Phi$ measured around the axis of rotation of the rotating member, this azimuthal angle being the desired measure of the relative rotation of the two members of the device.

Each of the one or more return beams 120 forms a spot of light 130 on part of the photosensitive portion of detector 200. Detector 200 comprises at least two individually readable photosensitive regions, the regions preferably being disposed in an annulus. Alternatively, detector 200 may be a PSD which has at least two output signals to indicate the lateral position of a spot of light on its photosensitive surface. In the preferred embodiment, wherein the central ray of cone 111 is parallel to the axis of rotation of beam generator 300, the annulus is centered on source 110. As an example, in FIG. 1 the detector has four discrete photosensitive regions, or detectors, identified as regions 210, 220, 230, and 240, each of which spans one quarter of the overall annular photodetective region. In the schematic depiction of FIG. 1, spot 130 is small compared to each photosensitive region so it generally illuminates only one of the four regions at one time, or, if it straddles the boundary between two regions, the two adjacent regions are each partially illuminated. The signals from regions 210, 220, 230, and 240 are transmitted to a signal processor (not illustrated) wherein the location of spot 130 is estimated by the relative strength of each detector's signal.

Figure 3:
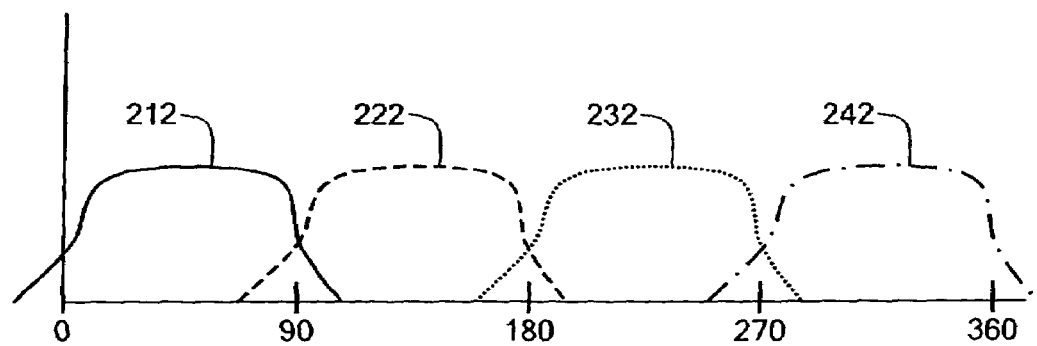
FIG. 3 schematically illustrates signals produced by the encoder of FIG. 1.

The signals from the four detectors are illustrated schematically in FIG. 3 wherein signals 212, 222, 232, and 242 are the signals from detectors 210, 220, 230, and 240 respectively. As illustrated in FIG. 3, the resolution of the encoder in azimuthal measurement is equivalent to the ability to resolve the location of the spot 130 around the annulus. Generally, the resolution is proportional to the number of detector elements forming the annulus. For example, with the four detector element system of FIG. 1, when signal 232 is high, spot 130 is estimated to be at an azimuthal angle between 180 degrees and 270 degrees—that is, it is resolved to one-quarter of a revolution. However, with a nearly Gaussian output beam covering multiple cells, the shape of the signals can have a pseudo-sinusoidal appearance, smoothing out the higher frequency distortion seen in FIG. 3. Such signals in quadrature can be processed by common algorithms such as the four-bin process and analog or digital interpolation schemes to yield high resolution estimates of the azimuthal angle.

Figure 4:
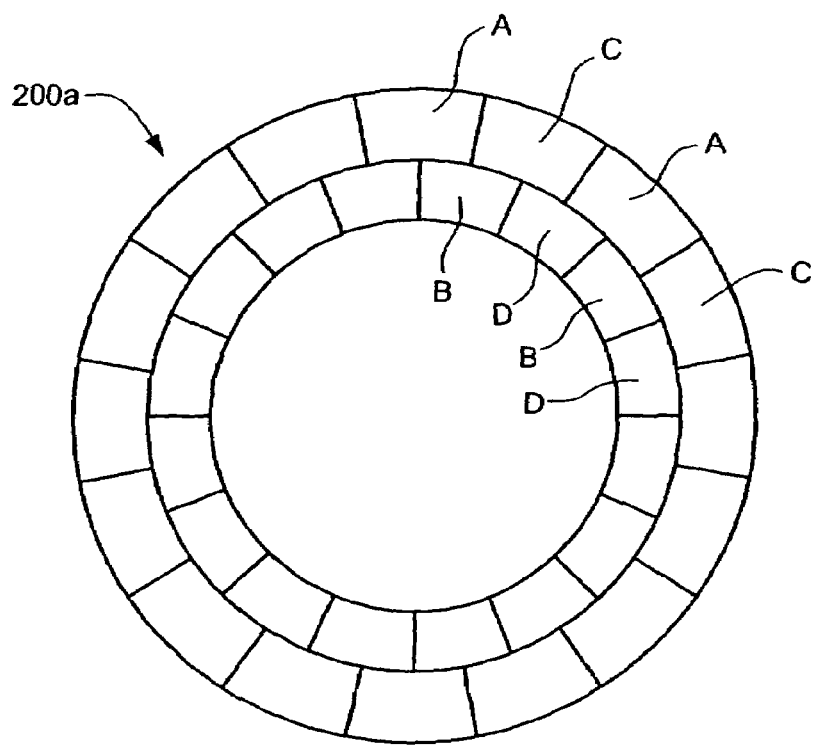
FIG. 4 shows an alternative detector configuration for the encoder.
Figure 5:
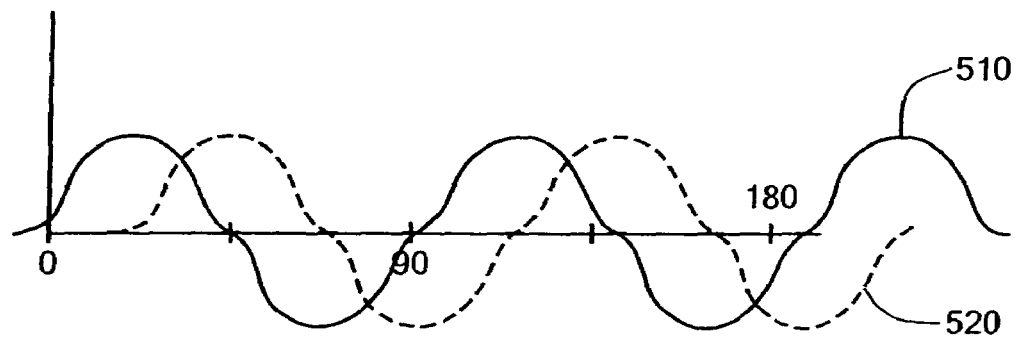
FIG. 5 schematically illustrates the signals produced by the encoder using the detector of FIG. 4.

There are many processing algorithms available in the prior art to identify the location of a spot of light based on the signals from an array of detector elements. Typically these algorithms have been applied to linear or rectilinear detector arrays. However, these algorithms may be extended for use in determining the azimuthal angle at which a spot of light is incident on an annular detector array. For example, a dual annulus detector 200a with 16 elements per annulus is illustrated in FIG. 4. The elements in the outer annulus are alternately designated "A" and "C" while the elements in the inner annulus are alternately designated "B" and "D". All elements with a common designation are electrically connected together such that four output signals are produced for this detector. Additionally, the two signals from the inner and outer annuli respectively are combined in the signal processor to form two "quadrature" signals; that is, as illustrated in FIG. 5, a sine-like signal 510 is formed by subtracting the "C" signal from the "A" signal and a cosine-like signal 520 is formed by subtracting the "D" signal from the "B" signal. Spot 130 is large enough to illuminate both annuli to produce both signals 510 and 520 simultaneously. These signals may be combined according to the arctangent function to estimate the position of spot 130. Such processing is well understood. Note that four electrical sine cycles are produced each time a spot completes a cycle around the annulus. Some additional measurement is required to eliminate this ambiguity. Of course, while the phase of the quadrature signals may be estimated with high resolution, the accuracy of the estimate is limited by the errors in signals 510 and 520.

Figure 7:
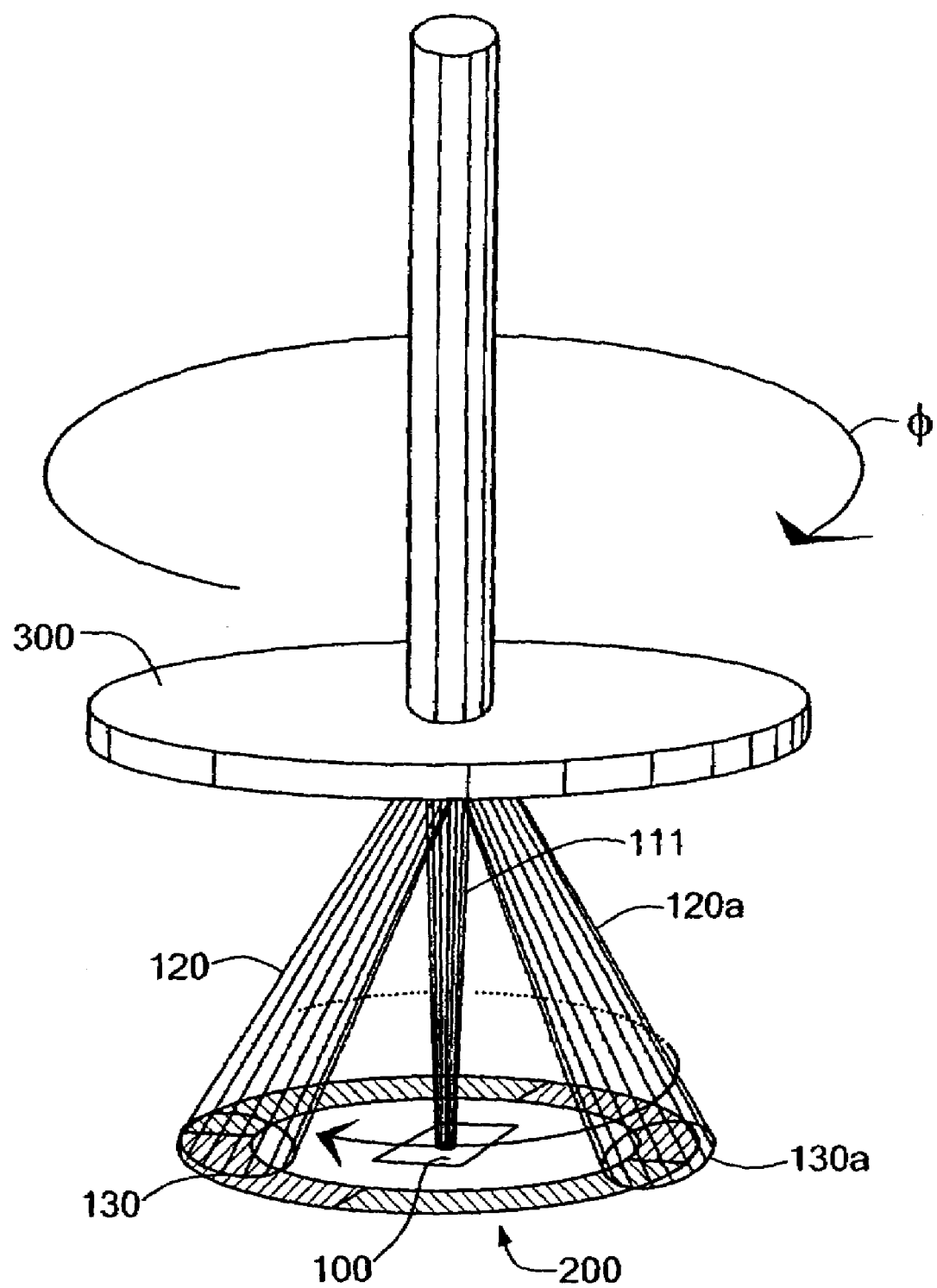
FIG. 7 is a schematic representation of one preferred embodiment of the encoder using a simple grating beam generator.
Figure 8:
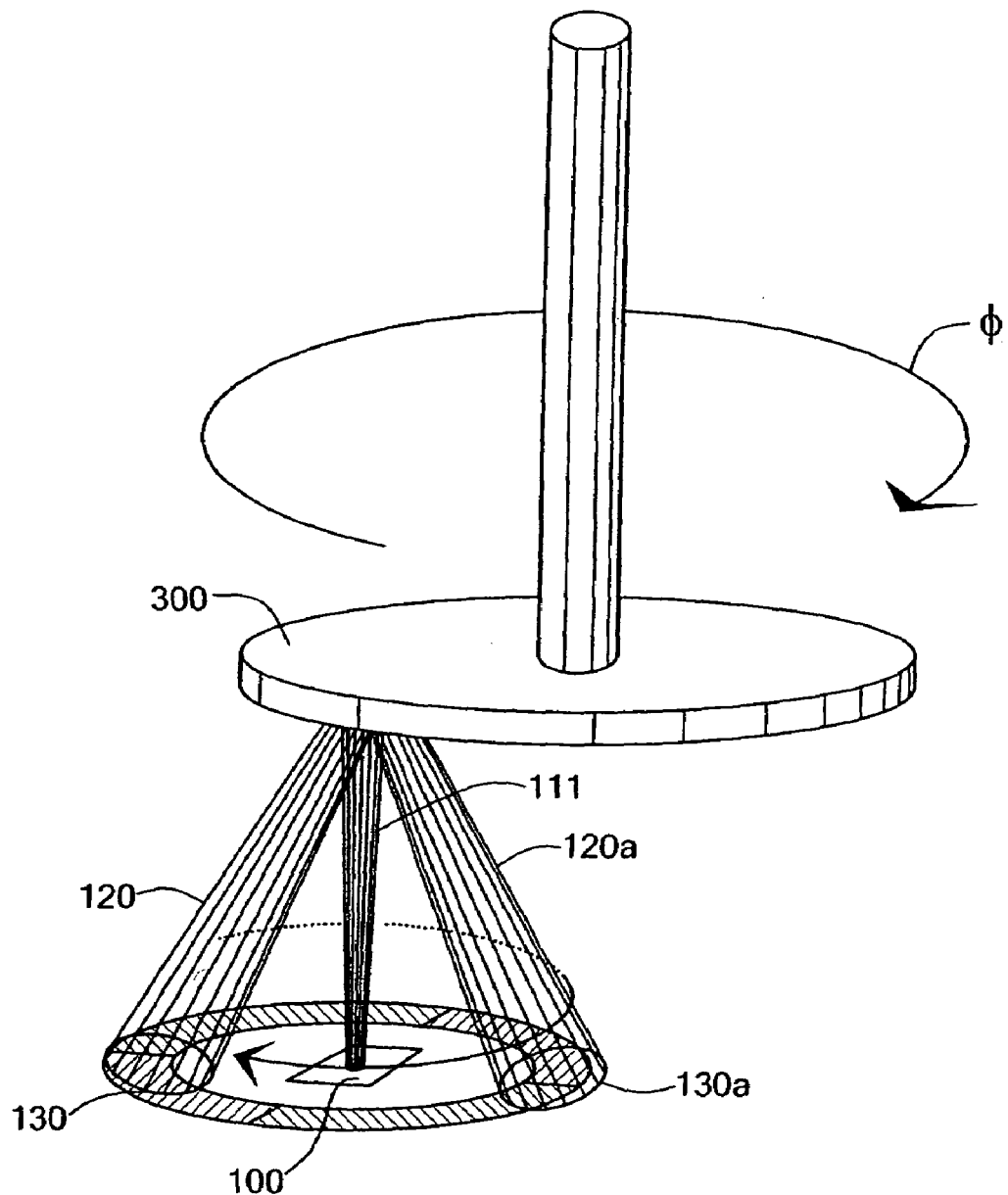
FIG. 8 shows the embodiment of FIG. 7 with lateral misalignment.

A preferred embodiment for sensor 10 uses a diffractive beam generator 300. This beam generator is preferably a periodic structure that, as shown in FIG. 7 in its simplest form, generates a pair of return beams 120 and 120a. More preferably, beam generator 300 is a phase-only reflective diffraction grating with a phase depth equal to one-quarter of the wavelength of source 100. Such a grating has no zero order. Each of beams 120, 120a is a first order beam, the higher diffractive orders not being illustrated. The beams are diffracted symmetrically about the input beam 111 to form two diametrically opposed spots 130 and 130a on detector 200. As with a plane mirror beam generator, the diffracted beams are directed to an annular region on the detector characterized by a polar angle (determined by the diffraction grating period) and an azimuthal angle (determined by the rotation of the beam generator about the rotation axis). As illustrated in FIG. 8, a diffractive beam generator advantageously is unaffected by transverse misalignments between the rotation axis of the beam generator 300 and the optical axis of the source 100.

In yet another embodiment, the beam generator 300 can be a special diffractive element called a Binary Optic Diffuse Reflector (BODR). In such a device the apparently random phase step function is actually designed to be a controlled optical diffuser. The special design of the phase step pattern creates well defined spots on the detectors. This technology is well understood and commercially available (see Digital Optics Corp. "Aurora" product—"Fused Silica Diffractive Diffusers DOC Aurora™ Illumination Solutions controlled-angle diffusers are primarily designed for input from a collimated source. At the element, light is diffracted into a defined angular distribution to create a specified output pattern in the far field"). Although these beam generators are more costly to produce, they can generate virtually any desired light spot pattern. Typically such a diffuser would be used to create "starburst" patterns that appear as multiple narrow "spots" around the annulus or, perhaps, to create a pattern with at least two asymmetric spots, the advantage of which is discussed below.

Figure 9:
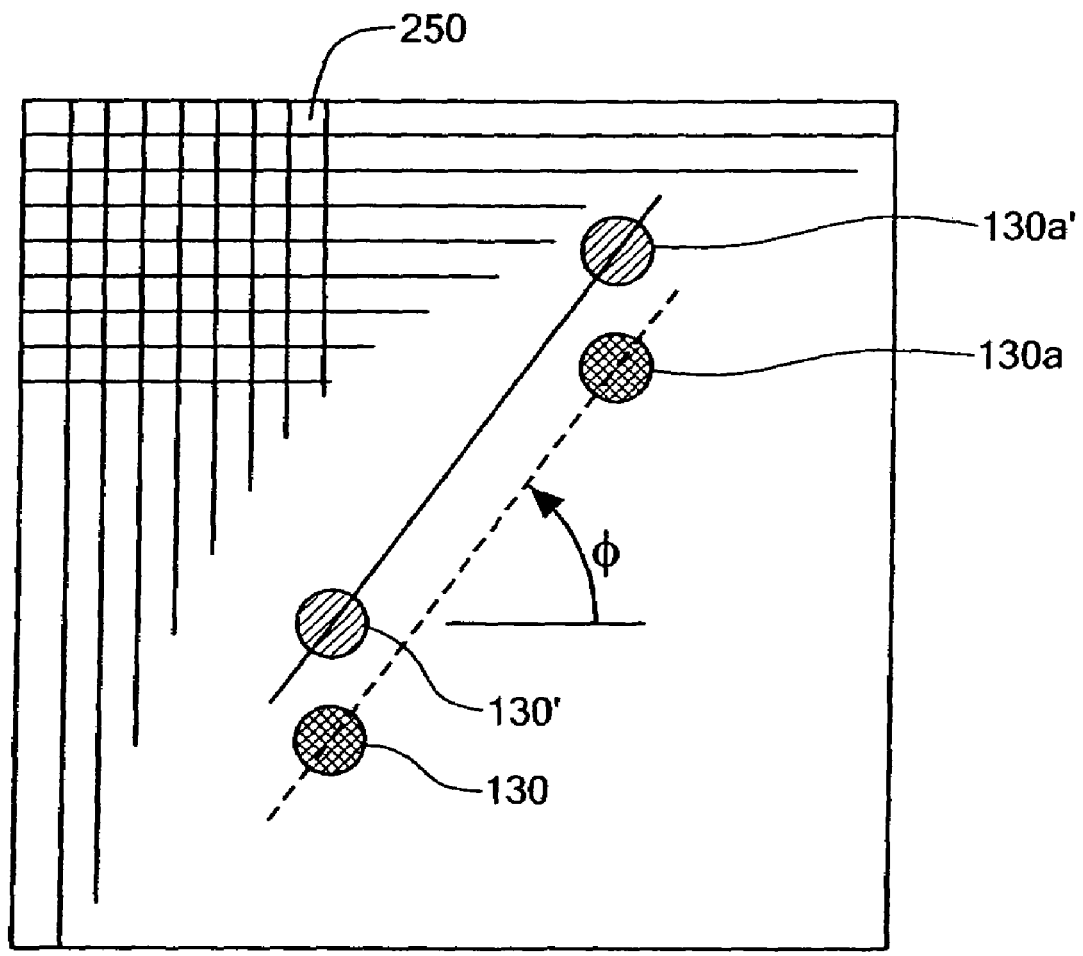
FIG. 9 shows a two-dimensional array detector configuration for the encoder.

One characteristic of a simple diffractive beam generator is that it produces two symmetric beams 130, 130a. Since both of these beams fall on the same set of detector elements, the sensor using this type of beam generator has a 180 degree ambiguity in the measurement of Φ. That is, when the beam generator rotates by ½ revolution from some initial position, the physical pattern of spots on the detector appears unchanged. This characteristic advantageously eliminates the encoder's sensitivity to tilt alignment errors. FIG. 9 illustrates this advantage by depicting the output of a basic diffractive beam generator—two diametrically opposed spots—incident on an alternative sensor embodiment, namely a two-dimensional array such as a CCD. The exact locations of the spots 130, 130a are determined by the azimuthal angle of the beam generator 300 and any tilt between the beam generator 300 and the source 100. However, the relative orientation of the spots is solely determined by the azimuthal angle, since, by definition, the spots define the diameter of the elliptical locus of points. The spots 130' and 130a' are shown at locations they occupy when there is non-zero tilt. Since both spots move by the same vector amount, the angle of the line connecting them is unchanged and still accurately represents the azimuthal direction.

The detector in FIG. 9 is a two-dimensional array of small pixel elements 250 which form an imaging array. The processing algorithms for determining the angle of a line connecting two well separated spots from the output of an imaging array is well-known in the image analysis art.

Figure 6:
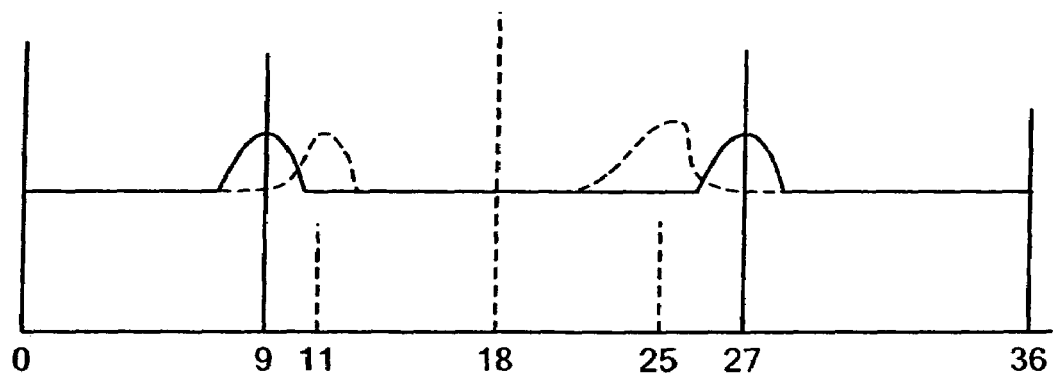
FIG. 6 illustrates an alternative signal processing approach.

There are also approaches for extracting the tilt-insensitive azimuthal angle from the signals generated by an annular detector array. FIG. 6 illustrates schematically the signal from a scanned annular 36-element array on which the two spots from a basic diffractive beam generator have fallen. In this embodiment each element around the annulus is read out individually, although preferably they are scanned sequentially to form a time sequential signal as illustrated. In the illustration, the spots 130 and 130a are located at the 9th and the 27th element respectively. Taking the average of the two element labels (average of 9 and 27 is 18), we would say that the azimuthal angle is 18/36*360 degrees or 180 degrees. If the beam generator tilts to move the spots perpendicular to their separation direction, their element locations change to, say, the 11th and 25th elements respectively. Again, the average of 11 and 25 is 18, so the azimuthal angle estimate is unchanged at 180 degrees. If, instead, the beam generator tilts to move the spots parallel to their separation direction, then their element locations do not change (under the assumption that the spots don't move so far as to no longer be incident on the annular region) and, of course, the azimuthal angle estimate does not change.

Figure 2:
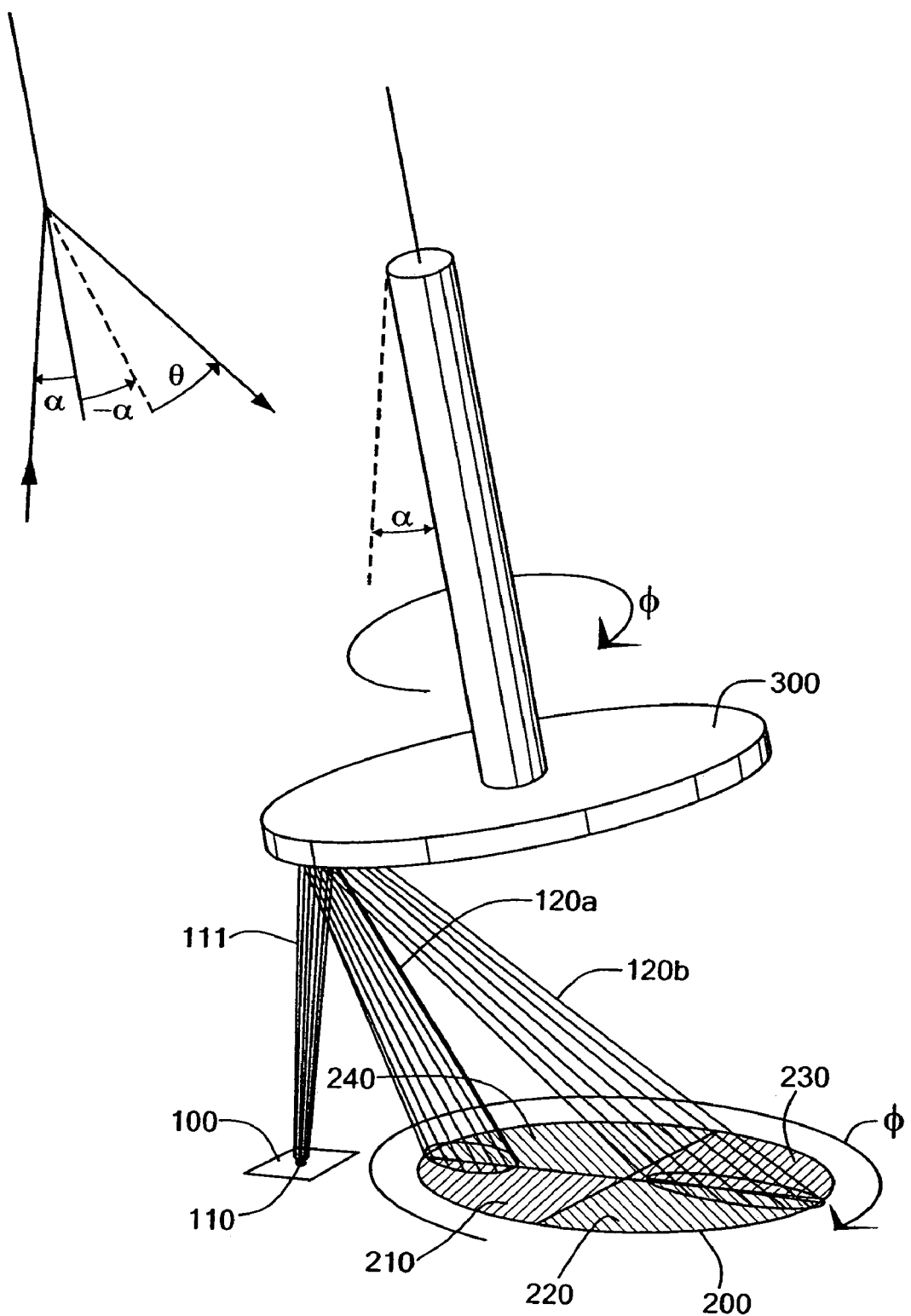
FIG. 2 illustrates an alternative embodiment of the encoder.

Another tilt-insensitive approach for an annular detector involves using an array similar to that shown in either FIG. 2 or 4. With an even number of beams diffracting from the beam generator 300, each pair of diametrically opposed beams compensates for the tilt, because one beam of the pair is advanced in phase and the other is equally retarded in phase as the beams walk on the detector due to the tilt. For example, in the simple case of an annular array of eight detector elements, these elements could be arranged in quads to yield four signals out. On one semicircular region of the array there are cells A through D; on the other half of the detector there is another set of A through D cells, such that the A cell of the second quad borders the D cell of the first quad. That is, beginning with the 12:00 position and moving clockwise, the cells are labeled A, B, C, D, A, B, C, and D. Like-labeled cells are connected together electrically. With two beams falling on the detector simultaneously under ideal alignment conditions, each illuminates the array identically and contributes to the output signals identically; if one beam is centered on one cell B, the other beam is centered on the other cell B. With a tilt of the beam generator, the beams walk such that one beam moves "down" the array toward C (tending to advance the phase of the output signals) as the other moves "up" the array toward A (tending to retard the phase of the output signals by the same magnitude). The outcome is a resultant signal whose phase is substantially unaffected by tilt.

As illustrated in the examples of FIG. 6 and FIG. 9, a tilt insensitive angular measurement is achieved by the addition of at least a second return beam to the one required beam. Unfortunately, whenever there are multiple spots on the detectors there is also an angular position ambiguity. The angular ambiguity so produced can be eliminated by introducing asymmetry in the relationship of the multiple spots to the detectors. There are many ways to achieve such asymmetry, particularly if a BODR is used as the beam generator. Typically, one spot will serve as the reference spot. For example, the reference spot can have greater optical intensity then the other spot(s), allowing the processor to identify the reference spot uniquely by threshold detection. Alternatively, one spot can be generated with a unique polar angle so that it falls on a different set of annular detectors than all the other spots. For example, using the dual annulus detector of FIG. 4, the one reference spot can be directed to the outer annulus while the remaining spots are directed to the inner annulus.

The ideal spot size on the detector may be different for the different detection schemes. In some cases the spot should be quite large to cover multiple cells, while in other cases it should be about the size of a single detector cell. The beam divergence from a VCSEL or LED may be so great that the spot size on the detector would be larger than desired. In that case, the beam diameter can be reduced through the use of an aperture or a lens. If an aperture is used, it would be positioned between the source and the rotating beam generator, and would be sufficiently small to restrict the beam from the source to a sufficiently small size. The aperture would preferably sit close enough to the beam generator so that nearly all of the reflected and diffracted light returns through the aperture. If a lens is used, the lens would sit in roughly the same location as the aperture. Its focal length would be chosen so the beam passing through the lens on the way out, and then returning through it on the way back, would converge sufficiently to end up at the desired diameter at the detector. The lens approach has the advantage of roughly maintaining the beam profile of the beam, which is likely to be Gaussian. This could aid in the smoothing of the output signal, which typically would be advantageous when interpolating the detector output signals to achieve higher position resolution.

Figure 10:
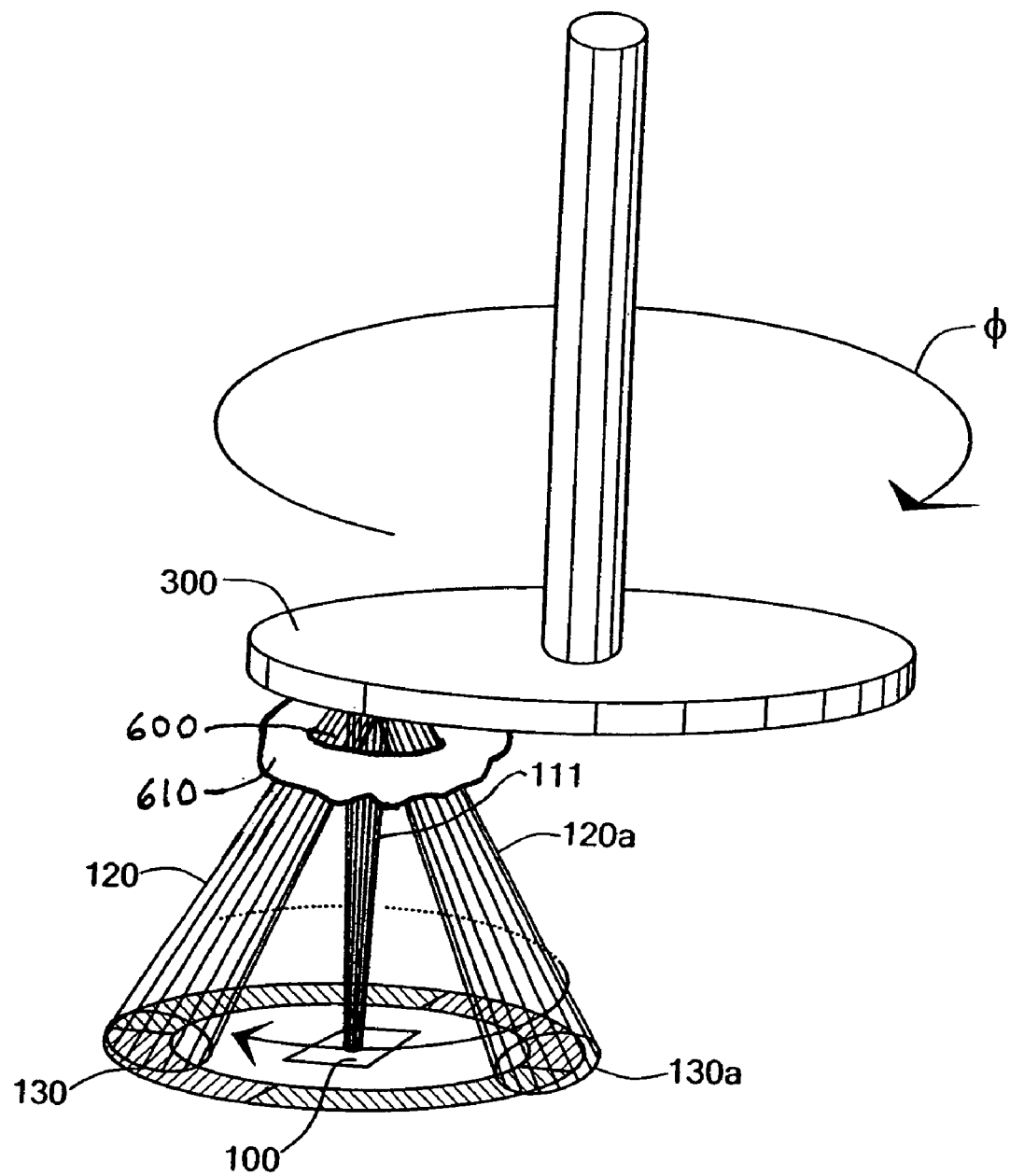
FIGS. 10 and 11 show embodiments of the encoder having an aperture and lens respectively for reducing beam diameter.
Figure 11:
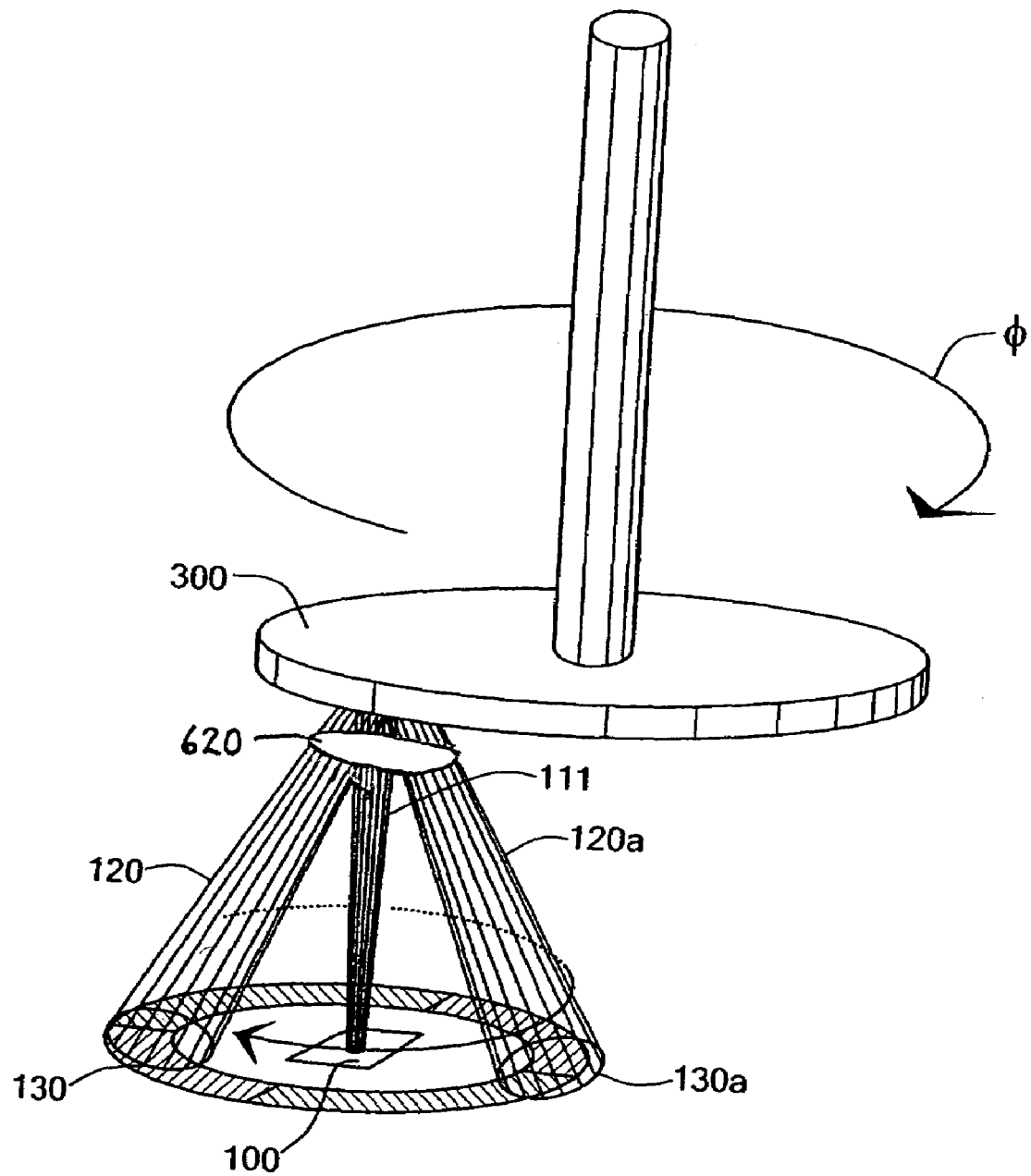

Examples of beam diameter reduction are shown in FIGS. 10 and 11. In FIG. 10, an aperture 600 is formed in an otherwise opaque material 610 disposed along the path of the beam 120. In FIG. 11, a lens 620 is disposed along the path of the beam 120.

As previously mentioned, the disclosed technique can also be realized in a transmissive configuration, in which the source 100 and the detector 200 face each other and a transmissive beam generation element is disposed therebetween. The transmissive beam generation element may be a transmissive diffraction grating, or a prismatic element that transmits a beam to the detector 200 having an angular shift with respect to the beam from the source 100.

Figure 12:
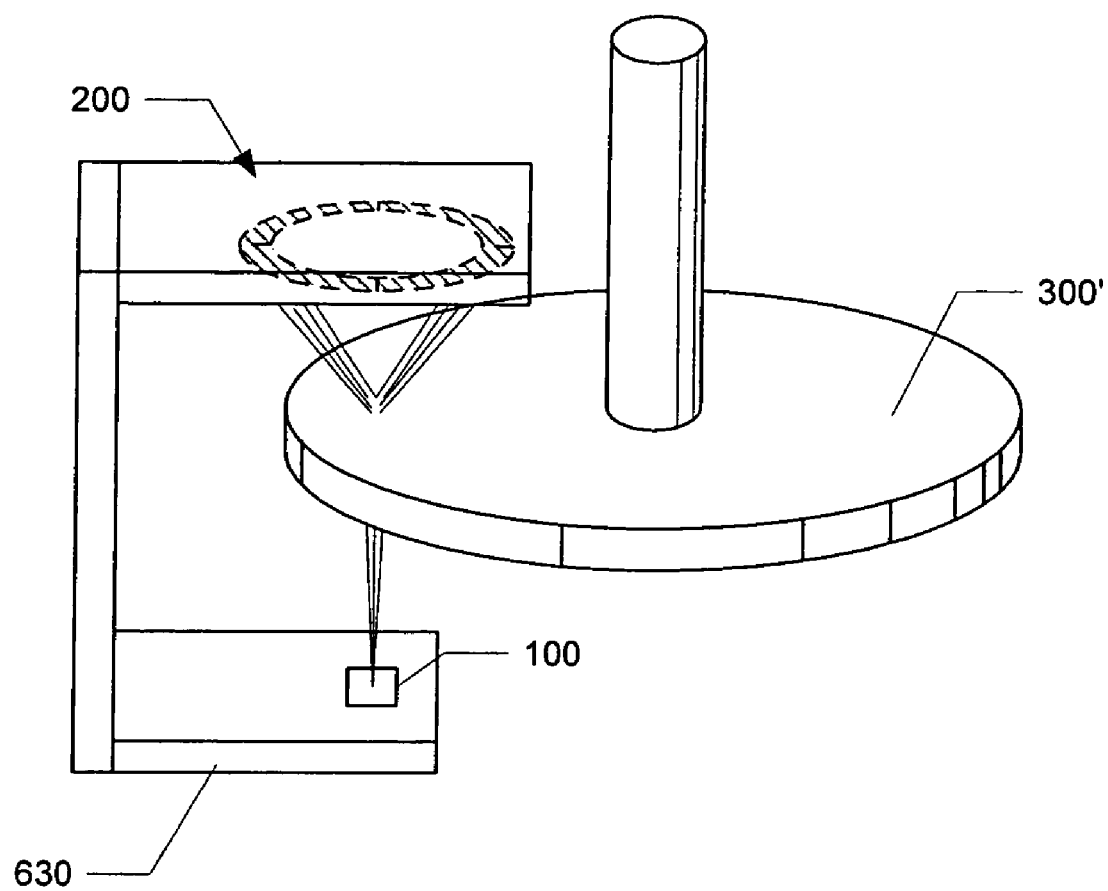
FIG. 12 shows an embodiment of the encoder having a transmissive beam generation element.

An example of such a transmissive configuration is shown in FIG. 12. The source 100 and detector 200 are located on an optical sensor head 630 on opposite sides of a transmissive beam generation element 300.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A measurement apparatus for determining the angular position of a first member with respect to a second member about a rotation axis, comprising:
   an optical sensor head on the first member, the sensor head comprising a source of a light beam and a plurality of light detecting elements;
   an offset beam generation element on the second member, the offset beam generation element being operative to receive the light beam from the source and to return an offset light beam to the sensor head, the offset light beam providing a light spot that travels in a generally elliptical path over the light detecting elements as relative rotation occurs between the first and second members; and
   a signal processor operative to process electrical signals produced by the detecting elements to determine the position of the offset beam of light along the elliptical path,
   wherein the beam generation element is transmissive.

2. A measurement apparatus according to claim 1, wherein the beam generation element comprises a prismatic element operative to impart an angular shift to the beam from the source.

3. A measurement apparatus according to claim 1, wherein the beam generation element comprises a transmissive diffractive optical element (DOE), the DOE diffractively producing at least one beam of light propagating towards the light detecting elements, the direction of the propagation being at a predetermined angle with respect to the rotation axis between the first member and the second member.

4. A measurement apparatus for determining the angular position of a first member with respect to a second member about a rotation axis, comprising:
   an optical sensor head on the first member, the sensor head comprising a source of a light beam and a plurality of light detecting elements;
   an offset beam generation element on the second member, the offset beam generation element being operative to receive the light beam from the source and to return an offset light beam to the sensor head, the offset light beam providing a light spot that travels in a generally elliptical path over the light detecting elements as relative rotation occurs between the first and second members; and
   a signal processor operative to process electrical signals produced by the detecting elements to determine the position of the offset beam of light along the elliptical path,
   wherein the beam generation element produces at least a first beam of light and a second beam of light, the first and second beams propagating towards the light detecting elements, the direction of propagation of the first beam being at a predetermined angle with respect to the rotation axis and the direction of propagation of the second beam being substantially along the rotation axis.

5. A measurement apparatus for determining the angular position of a first member with respect to a second member about a rotation axis, comprising:
an optical sensor head on the first member, the sensor head comprising a source of a light beam and a plurality of light detecting elements;
an offset beam generation element on the second member, the offset beam generation element being operative to receive the light beam from the source and to return an offset light beam to the sensor head, the offset light beam providing a light spot that travels in a generally elliptical path over the light detecting elements as relative rotation occurs between the first and second members; and
a signal processor operative to process electrical signals produced by the detecting elements to determine the position of the offset beam of light along the elliptical path,
wherein the beam generation element comprises a reflective diffractive optical element (DOE), the DOE diffractively producing at least one beam of light propagating towards the light detecting elements, the direction of the propagation being at a predetermined angle with respect to the rotation axis between the first member and the second member.

6. A measurement apparatus according to claim 5, wherein the light source comprises a solid state source.

7. A measurement apparatus according to claim 6, wherein the solid state source comprises a vertical cavity surface emitting laser.

8. A measurement apparatus according to claim 6, wherein the solid state source comprises a light emitting diode (LED).

9. A measurement apparatus according to claim 5, wherein the light detecting elements are disposed to form one or more annuli surrounding the light source.

10. A measurement apparatus according to claim 5, wherein the light detecting elements are arranged in a two dimensional array.

11. A measurement apparatus according to claim 5, wherein the DOE comprises a linear diffraction grating.

12. A measurement apparatus according to claim 5, wherein the DOE is a binary diffuser.

13. A measurement apparatus according to claim 5, further comprising an aperture disposed between the sensor head and the offset beam generation element, the aperture being operative to reduce the size of the light spot on the light detecting elements from the offset light beam.

14. A measurement apparatus according to claim 5, further comprising a lens disposed between the sensor head and the offset beam generation element, the lens being operative to reduce the size of the light spot on the light detecting elements from the offset light beam.

15. A measurement apparatus for determining the angular position of a first member with respect to a second member about a rotation axis, comprising:
an optical sensor head on the first member, the sensor head comprising a source of a light beam and a plurality of light detecting elements;
an offset beam generation element on the second member, the offset beam generation element being operative to receive the light beam from the source and to return an offset light beam to the sensor head, the offset light beam providing a light spot that travels in a generally elliptical path over the light detecting elements as relative rotation occurs between the first and second members; and
a signal processor operative to process electrical signals produced by the detecting elements to determine the position of the offset beam of light along the elliptical path,
wherein the beam generation element produces at least a first beam of light and a second beam of light, the beams propagating towards the light detecting elements, wherein the first beam of light is adapted to have a predetermined unique characteristic.

16. A measurement apparatus according to claim 15, wherein the signal processor of the apparatus is adapted to identify the first beam of light based on the predetermined unique characteristic.

17. A measurement apparatus according to claim 15, wherein the predetermined unique characteristic is the polar angular location of the spot generated by the first beam of light.

18. A measurement apparatus according to claim 15, wherein the predetermined unique characteristic is the optical intensity of the first beam of light.

19. A measurement apparatus for determining the angular position of a first member with respect to a second member about a rotation axis, comprising:
an optical sensor head on the first member, the sensor head comprising a source of a light beam and a plurality of light detecting elements;
an offset beam generation element on the second member, the offset beam generation element being operative to receive the light beam from the source and to return an offset light beam to the sensor head, the offset light beam providing a light spot that travels in a generally elliptical path over the light detecting elements as relative rotation occurs between the first and second members; and
a signal processor operative to process electrical signals produced by the detecting elements to determine the position of the offset beam of light along the elliptical path,
wherein the beam generation element produces at least three beams of light propagating towards the light detecting elements, the direction of propagation of each beam being at a respective predetermined angle with respect to the rotation axis.

* * * * *